Patented Apr. 2, 1940

2,196,082

UNITED STATES PATENT OFFICE

2,196,082

METHOD OF PREPARING LUMINESCENT MATERIAL

Willard A. Roberts, Cleveland Heights, Ohio, assignor to General Electric Company, a corporation of New York No Drawing. Application April 22, 1936, Serial No. 75,781

10 Claims. (Cl. 250—81)

My invention relates to a method of preparing luminescent materials and has for its object the production of materials having a higher brightness value.

I have discovered that if a luminescent material is heated and then suddenly cooled or quenched, as by plunging it into water, it has a higher brightness value when it is excited by ultra-violet rays. The materials when prepared in this manner are whiter and produce a powder which flows much more freely, like a fine sand, thereby making it easier to apply the material to glass surfaces. Such a material may be readily applied to the surface of the glass envelope of a mercury discharge lamp to transform waves of certain wave length emitted by the gaseous electric discharge in the lamp into rays of other wave length to complement and supplement the light emitted by said discharge.

The following data illustrates some results obtained by quenching various fluorescent materials, the material in each case being heated to approximately 1000° C. and then quenched in water. The brightness values in each case are the brightness of the particular composition as compared with an arbitrary standard brightness of one hundred per cent. The measurements of brightness were made by placing a small quantity of the material in a dish and subjecting it to the rays of a mercury vapor discharge lamp, the light from the fluorescent material falling upon a photo-electric cell which was connected to a galvanometer. The reading on the galvanometer for each material was then converted into per cent of brightness as compared with the reading for the standard brightness of one hundred per cent.

One of the materials treated in the manner described was a cadmium-silica-manganese phosphor described and claimed in my co-pending U. S. patent application Serial No. 75,783, of even date, and consisting of about sixty parts of CdO and forty parts of $SiO_2$, by weight, with different amounts of $MnO_2$ added as an exciter to increase the efficiency of the material. The material may be prepared by heating together a cadmium compound, such as cadmium nitrate or acetate, which will decompose when heated in air to give cadmium oxide at a temperature lower than that required to form the fluorescent material; silica, or a silicon compound such as silicic acid which will decompose when heated in air to give silica at a temperature lower than that required to form the fluorescent material; and an exciter such as a manganese compound, preferably manganese dioxide or chloride or potassium permanganate. The proportions of the cadmium compound and silica are such that from ten to forty per cent less cadmium oxide is used than is required by the chemical formula $CdSiO_3$. These materials were prepared by mixing the ingredients and heating to about 1000° C. for forty-eight hours. The following table shows the increase in brightness of the material containing different amounts of $MnO_2$ when unquenched and when quenched in water after the final furnace treatment at 1000° C.

| Parts $MnO_2$ | Brightness | |
|---|---|---|
| | Unquenched | Quenched |
| .4 | 65 | 69 |
| .85 | 91 | 110 |
| 1.2 | 99 | 108 |
| 1.5 | 105 | 112 |
| 2.0 | 102 | 110 |
| 2.5 | 93 | 102 |

It will be seen from the table that with .85 part of $MnO_2$, the brightness of the material was increased about twenty-two per cent.

Another of the materials treated according to my invention was a zinc-silica-manganese phosphor described and claimed in my U. S. patent application Serial No. 75,780, of even date, and consisting of about sixty parts of ZnO and forty parts of $SiO_2$ with different amounts of $MnO_2$ added as an exciter to increase the efficiency of the material. The material may be prepared by heating together a zinc compound, such as zinc nitrate or zinc acetate which will fuse and decompose when heated in air to give zinc oxide at a temperature lower than that required to form the fluorescent material; silica, or a silicon compound such as silicic acid which will decompose when heated in air to give silica at a temperature lower than that required to form the fluorescent material; and an exciter such as a manganese compound, preferably manganese dioxide or chloride or potassium permanganate. The proportions of the zinc compound and silica are preferably such that from one to twenty per cent more zinc oxide is used than is required by the chemical formula $ZnSiO_3$. These materials were prepared by mixing the ingredients and heating to about 1000° C. for forty hours. The following table shows the increase in brightness of the material containing different amounts of $MnO_2$ when unquenched and when quenched in water after the final furnace treatment at 1000° C.

| Parts MnO₂ | Brightness | |
|---|---|---|
| | Unquenched | Quenched |
| 1.1 | 139 | 144 |
| 1.6 | 135 | 154 |
| 2.2 | 152 | 159 |
| 2.7 | 145 | 158 |

It will be seen from the table that with 1.6 parts of $MnO_2$, the brightness of the material was increased about fourteen per cent.

Still another of the materials treated according to my invention was a calcium-tungsten phosphor described and claimed in my U. S. patent application Serial No. 75,782, of even date, and consisting essentially of calcium tungstate with an excess of CaO and with or without a small amount of lead added as an exciter. The material may be prepared by heating together calcium oxide or a calcium compound, such as calcium carbonate which will decompose when heated in air to give calcium oxide at a temperature lower than that required to form the fluorescent material; tungsten oxide, tungstic acid or some material which decomposes when heated in air to give tungstic oxide at a temperature lower than that required to form the fluorescent material; an exciter such as a soluble lead compound, preferably lead acetate. The proportions of the calcium compound and tungstic oxide are preferably such that from one to ten per cent more calcium oxide is used than is required by the chemical formula $CaWO_4$. These materials were prepared by mixing the ingredients and heating to about 1000° C. for one and a half hours. The following table shows the brightness of the material with and without different amounts of lead when unquenched and when quenched in water after the final furnace treatment at 1000° C.

| Pb | Brightness | |
|---|---|---|
| | Unquenched | Quenched |
| 0.0% | 88 | 96 |
| 0.5% | 108 | 117 |
| 0.75% | 112 | 121 |
| 1.0% | 115 | 123 |
| 1.5% | 115 | 118 |

It will be seen from the table that with from none to one per cent of lead the brightness of the material was increased between nine and seven per cent.

The temperature of 1000° C. referred to above is in each case appreciably below the fusion point of the luminescent material.

The tables of the three different materials given above show that when a luminescent material is heated and then suddenly cooled or quenched, a product is consistently obtained which has a higher brightness value than the unquenched material. Moreover, the powdered material is whiter and flows better and is therefore more easily applied to glass surfaces.

What I claim as new and desire to secure by Letters Patent of the United States is:

1. The method of preparing a fluorescent material which comprises heating together zinc oxide, silica and a small quantity of a manganese compound to form a fluorescent material approximating zinc silicate and then quenching the heated material to increase its brightness value.

2. The method of preparing a fluorescent material which comprises heating together cadmium nitrate, silica and a small quantity of a manganese compound to form a fluorescent material approxmating cadmium silicate and then quenching the heated material to increase its brightness value.

3. The method of preparing a fluorescent material which comprises heating together calcium oxide and tungstic acid to form a fluorescent material approximating calcium tungstate and then quenching the heated material to increase its brightness value.

4. The method of preparing a luminescent material which comprises heating together at an elevated temperature sufficiently high to form the desired material but below its fusion temperature a mixture of constituents which leave as a residue only the luminescent material desired and then quenching the heated material from said elevated temperature to increase its brightness value.

5. In the manufacture of luminescent materials, the method of increasing the brightness value of the material which consists in quenching a heated quantity of the end product from an elevated temperature below its fusion temperature but sufficiently high to impart an appreciably greater degree of luminescence to the quenched product.

6. The method of preparing a luminescent material which is formed without fusion at a temperature of about 1000° C. which comprises heating to a temperature of the order of 1000° C. a mixture of constituents which leave as a residue only the luminescent material desired and then quenching the heated material to increase its brightness value.

7. In the manufacture of luminescent materials having a fusion temperature appreciably in excess of 1000° C., the method of increasing the brightness value of the material which consists in quenching from a temperature of the order of 1000° C. a heated quantity of the end product.

8. The method of preparing a fluorescent material which comprises heating together at an elevated temperature sufficiently high to form the desired material but below its fusion temperature a mixture of constituents to form a fluorescent material comprising a heat treated combination of cadmium oxide, silica and a small quantity of an exciter and then quenching the heated material from said elevated temperature to increase its brightnes value.

9. The method of preparing a luminescent material which is formed without fusion at a temperature of about 1000° C. which comprises heating to a temperature of the order of 1000° C. a mixture of constituents which leave as a residue only a luminescent material consisting of an oxygenated acid salt, and then quenching the heated material to increase its brightness value.

10. The method of preparing a luminescent material which is formed without fusion at a temperature of about 1000° C. which comprises heating to a temperature of the order of 1000° C. a mixture of constituents which leave as a residue only a luminescent material consisting of an oxygenated silicon salt, and then quenching the heated material to increase its brightness value.

WILLARD A. ROBERTS.